(12) United States Patent
Lin

(10) Patent No.: US 12,082,205 B2
(45) Date of Patent: Sep. 3, 2024

(54) FEEDBACK RESOURCE ALLOCATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 655 days.

(21) Appl. No.: 17/196,785

(22) Filed: Mar. 9, 2021

(65) Prior Publication Data

US 2021/0195628 A1   Jun. 24, 2021

Related U.S. Application Data

(63) Continuation of application No. PCT/CN2018/107419, filed on Sep. 25, 2018.

(51) Int. Cl.
*H04W 72/23* (2023.01)
*H04L 1/1812* (2023.01)
*H04W 72/0446* (2023.01)

(52) U.S. Cl.
CPC .......... *H04W 72/23* (2023.01); *H04L 1/1812* (2013.01); *H04W 72/0446* (2013.01)

(58) Field of Classification Search
CPC ............. H04W 72/23; H04W 72/0446; H04W 72/1273; H04L 1/1812; H04L 1/1825;
(Continued)

(56) References Cited

U.S. PATENT DOCUMENTS

2015/0131494 A1* 5/2015 He ............ H04W 52/38 370/280
2019/0068317 A1* 2/2019 Babaei ............ H04L 1/1664
(Continued)

FOREIGN PATENT DOCUMENTS

CN  101667898 A  3/2010
CN  101686113 A  3/2010
(Continued)

OTHER PUBLICATIONS

First Examination Report of the European application No. 18935338.6, issued on Apr. 29, 2022. 7 pages.
(Continued)

*Primary Examiner* — Michael K Phillips
(74) *Attorney, Agent, or Firm* — PERKINS COIE LLP

(57) ABSTRACT

Disclosed are a feedback resource allocation method, a terminal device, a network device, a chip, a computer readable storage medium, a computer program product, and a computer program. The method includes: receiving feedback resource configuration information sent by a network side, wherein the feedback resource configuration information is used for allocating feedback resources, and the allocation of the feedback resources is limited by feedback multiplexing granularity or feedback timing granularity, wherein the feedback multiplexing granularity represents a time-domain range of a multiplexing window for feedback information. The time-domain range is: a time slot, a half time slot, and N symbols, and N is an integer greater than or equal to 1; the feedback timing granularity is one of the following: the time slot, the half time slot, and N symbols, and N is the integer greater than or equal to 1.

8 Claims, 4 Drawing Sheets

---

201

Allocate feedback resources based on a limitation of a feedback multiplexing granularity or a feedback timing granularity, when allocating the feedback resources of a downlink transmission

(58) Field of Classification Search
CPC ... H04L 1/1896; H04L 1/1854; H04L 1/1861; H04L 5/0055; H04L 5/0094
See application file for complete search history.

(56) References Cited

U.S. PATENT DOCUMENTS

| | | | | |
|---|---|---|---|---|
| 2019/0268971 | A1* | 8/2019 | Talarico | H04W 76/27 |
| 2020/0084789 | A1* | 3/2020 | Wang | H04L 1/1825 |
| 2020/0259594 | A1* | 8/2020 | Takeda | H04L 1/1858 |
| 2020/0389262 | A1 | 12/2020 | Oh et al. | |

FOREIGN PATENT DOCUMENTS

| | | |
|---|---|---|
| CN | 102082641 A | 6/2011 |
| KR | 20180018286 A | 2/2018 |
| WO | 2015137782 A1 | 9/2015 |

OTHER PUBLICATIONS

Examination Report for European Application No. 18935338.6 issued Nov. 4, 2022. 7 pages.
First Office Action for Chinese Application No. 202111618728.7 issued Jan. 13, 2023. 12 pages with English translation.
International Search Report mailed Jun. 25, 2019 of PCT/CN2018/107419 (4 pages).
Examination Report for Indian Application No. 202117010010 issued Feb. 2, 2022. 6 pages with English translation.
EPO, Extended European Search Report for European Application No. 18935338.6. Mail Date: Jul. 26, 2021. 11 pages.
NTT DOCOMO, Inc. "Views on UCI on sPUSCH" R1-1702786; 3GPP TSG RAN WG1 Meeting #88; Feb. 13-17, 2017. 5 pages.
Samsung "HARQ Management and Feedback" R1-1712034; 3GPP TSG RAN WG1 Meeting 91; Nov. 27-Dec. 1, 2017. 8 pages.
MCC Support "Draft Report of 3GPP TSF RAN WG1 #94 v0.1.0" R1-180xxxx; 3GPP TSF RAN WG1 Meeting #94bis; Oct. 8-12, 2018. 188 pages.

* cited by examiner

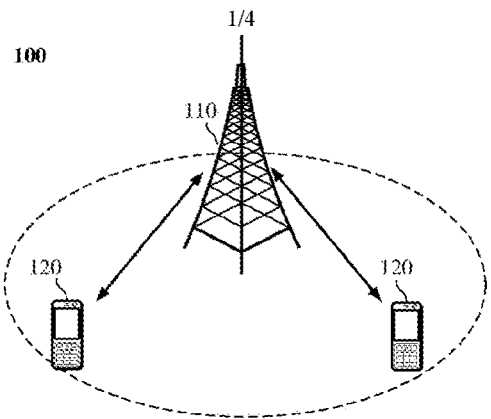
FIG. 1
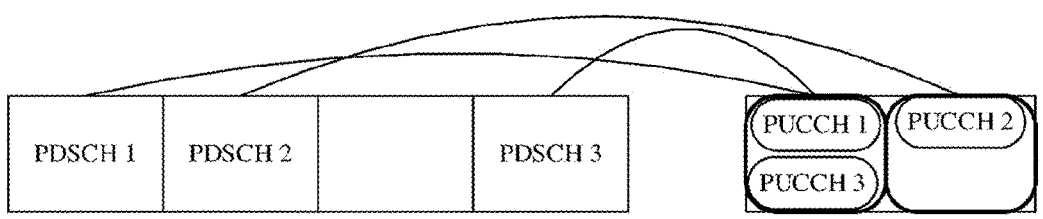
FIG. 2
FIG. 3
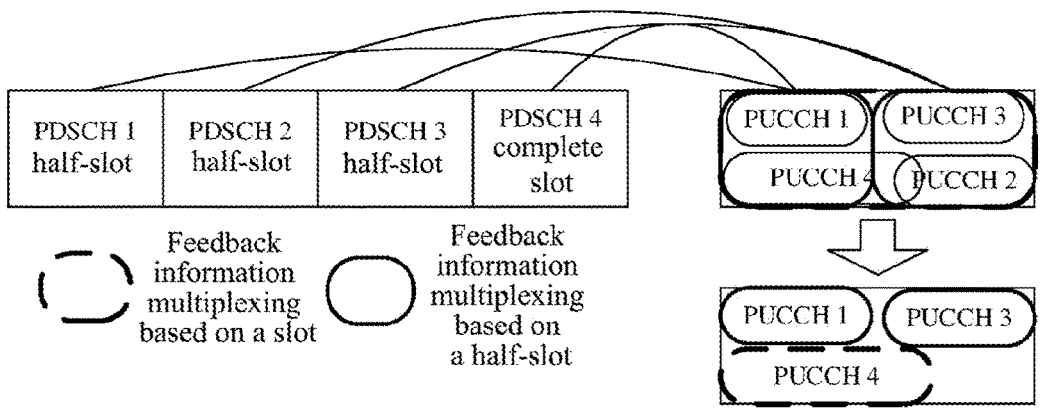
FIG. 4

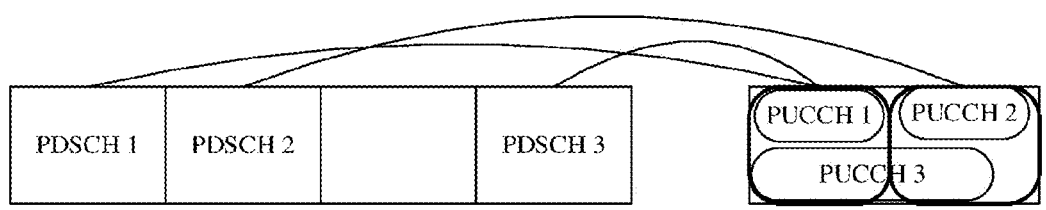
FIG. 5
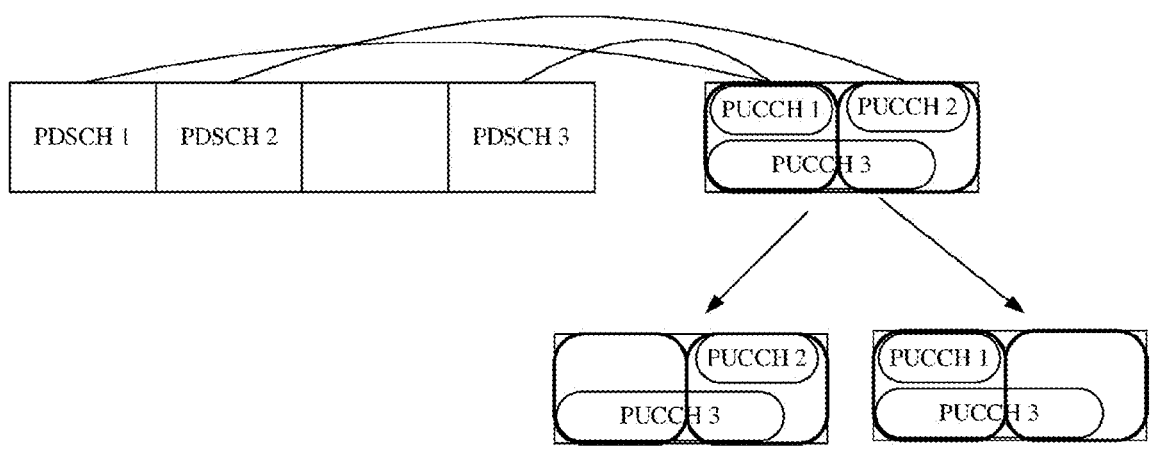
FIG. 6
FIG. 7
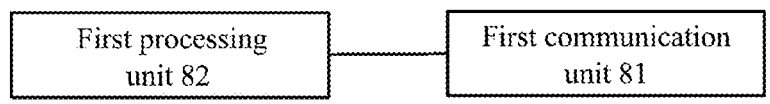
FIG. 8

FEEDBACK RESOURCE ALLOCATION METHOD, TERMINAL DEVICE, AND NETWORK DEVICE

CROSS-REFERENCE TO RELATED APPLICATION

The present application is a continuation application of International PCT Application No. PCT/CN2018/107419, filed on Sep. 25, 2018, the entire content of which is hereby incorporated by reference.

TECHNICAL FIELD

The present disclosure relates to a technical field of information processing, in particular to a feedback resource allocation method, a terminal device, a network device, a chip, a computer readable storage medium, a computer program product and a computer program.

BACKGROUND

In a New Radio (NR) Rel-15, a base station indicates a slot for transmitting Downlink Control Information (DCI) or feedback information (such as ACK/NACK) corresponding to a Physical Downlink Shared Channel (PDSCH) scheduled by the DCI through downlink scheduling signaling such as an information field of PDSCH-to-Hybrid Automatic Repeat reQuest (HARQ) feedback timing indicator in the DCI. However, for a URLLC service, because it is sensitive to a transmission delay, adoption of an HARQ timing indication based on a slot level in Rel-15 may not meet a delay requirement.

SUMMARY

To solve above technical problems, implementations of the present disclosure provide a method for allocating feedback resources, a terminal device, a network device, a chip, a computer readable storage medium, a computer program product, and a computer program.

In a first aspect, an implementation of the present disclosure provides a method for allocating feedback resources, applied to a terminal device, including:
receiving feedback resource configuration information sent by a network side; wherein the feedback resource configuration information is used for allocating feedback resources, and the allocation of the feedback resources is limited by a feedback multiplexing granularity or a feedback timing granularity.

The feedback multiplexing granularity represents a time domain range of a multiplexing window of feedback information, the time domain range is a slot, a half-slot, and N symbols, where N is an integer greater than or equal to 1. The feedback timing granularity is one of following: a slot, a half-slot, and N symbols, where N is an integer greater than or equal to 1.

In a second aspect, an implementation of the present disclosure provides a method for allocating feedback resources, applied to a terminal device, including:
receiving feedback resource configuration information sent by a network side, wherein the feedback resource configuration information is used for allocating feedback resources, and the allocation of the feedback resources is not limited by a feedback multiplexing granularity or a feedback timing granularity, but is limited by a preset time domain threshold value.

The feedback multiplexing granularity represents a time domain range of a multiplexing window of feedback information. The time domain range is a slot, a half-slot, and N symbols, where N is an integer greater than or equal to 1. The feedback timing granularity is one of following: a slot, a half-slot, and N symbols, where N is an integer greater than or equal to 1. The preset time domain threshold value is greater than or equal to the feedback multiplexing granularity or the feedback timing granularity.

In a third aspect, an implementation of the present disclosure provides a method for allocating feedback resources, applied to a network device, including:
sending feedback resource configuration information to a terminal device; wherein the feedback resource configuration information is used for allocating feedback resources, and the allocation of the feedback resources is limited by a feedback multiplexing granularity or a feedback timing granularity.

The feedback multiplexing granularity represents a time domain range of a multiplexing window of feedback information. The time domain range is a slot, a half-slot, and N symbols, where N is an integer greater than or equal to 1. The feedback timing granularity is one of following: a slot, a half-slot, and N symbols, where N is an integer greater than or equal to 1.

In a fourth aspect, an implementation of the present disclosure provides a method for allocating feedback resources, applied to a network device, including:
sending feedback resource configuration information to a terminal device; wherein the feedback resource configuration information is used for allocating feedback resources, and the allocation of the feedback resources is not limited by a feedback multiplexing granularity or a feedback timing granularity, but is limited by a preset time domain threshold value.

The feedback multiplexing granularity represents a time domain range of a multiplexing window of feedback information. The time domain range is a slot, a half-slot, and N symbols, where N is an integer greater than or equal to 1. The feedback timing granularity is one of following: a slot, a half-slot, and N symbols, where N is an integer greater than or equal to 1. The preset time domain threshold value is greater than or equal to the feedback multiplexing granularity or the feedback timing granularity.

In a fifth aspect, there is provided a terminal device including:
a first communication unit, configured to receive feedback resource configuration information sent by a network side; wherein the feedback resource configuration information is used for allocating feedback resources, and then allocation of the feedback resources is limited by a feedback multiplexing granularity or a feedback timing granularity.

The feedback multiplexing granularity represents a time domain range of a multiplexing window of the feedback information. The time domain range is a slot, a half-slot, and N symbols, where N is an integer greater than or equal to 1. The feedback timing granularity is one of following: a slot, a half-slot, and N symbols, where N is an integer greater than or equal to 1.

In a sixth aspect, there is provided a terminal device including:
a second communication unit, configured to receive feedback resource configuration information sent by a network side; wherein the feedback resource configuration information is used for allocating feedback resources, and the allocation of the feedback resources is not limited by a feedback multiplexing granularity or a feedback timing granularity, but is limited by a preset time domain threshold value.

The feedback multiplexing granularity represents a time domain range of a multiplexing window of feedback information. The time domain range is a slot, a half-slot, and N symbols, where N is an integer greater than or equal to 1. The feedback timing granularity is one of following: a slot, a half-slot, and N symbols, where N is an integer greater than or equal to 1. The preset time domain threshold value is greater than or equal to the feedback multiplexing granularity or the feedback timing granularity.

In a seventh aspect, there is provided a network device including:
- a third communication unit, configured to send feedback resource configuration information to a terminal device; wherein the feedback resource configuration information is used for allocating feedback resources, and the allocation of the feedback resources is limited by a feedback multiplexing granularity or a feedback timing granularity.

The feedback multiplexing granularity represents a time domain range of a multiplexing window of feedback information. The time domain range is a slot, a half-slot, and N symbols, where N is an integer greater than or equal to 1. The feedback timing granularity is one of following: a slot, a half-slot, and N symbols, where N is an integer greater than or equal to 1.

In a eighth aspect, there is provided a network device including:
- a fourth communication unit, configured to send feedback resource configuration information to a terminal device; wherein the feedback resource configuration information is used for allocating feedback resources, and the allocation of the feedback resources is not limited by a feedback multiplexing granularity or a feedback timing granularity, but is limited by a preset time domain threshold value.

The feedback multiplexing granularity represents a time domain range of a multiplexing window of feedback information. The time domain range is a slot, a half-slot, and N symbols, where N is an integer greater than or equal to 1. The feedback timing granularity is one of following: a slot, a half-slot, and N symbols, where N is an integer greater than or equal to 1. The preset time domain threshold value is greater than or equal to the feedback multiplexing granularity or the feedback timing granularity.

In a ninth aspect, there is provided a terminal device, including a processor and a memory. The memory is configured to store a computer program, and the processor is configured to call and run the computer program stored in the memory to execute the method in the first aspect or various implementation modes thereof.

In a tenth aspect, there is provided a network device, including a processor and a memory. The memory is configured to store a computer program, and the processor is configured to call and run the computer program stored in the memory to execute the method in the second aspect or various implementation modes thereof.

In an eleventh aspect, there is provided a chip for implementing the method in any one aspect of the above first to second aspects or various implementation modes thereof.

Specifically, the chip includes a processor, configured to call and run a computer program from a memory, to enable a device in which the chip is installed to execute the method in any one aspect of above first to second aspects or various implementation modes thereof.

In a twelfth aspect, there is provided a computer-readable storage medium for storing a computer program, wherein the computer program enables a computer to execute the method in any one aspect of the above first to second aspects or various implementation modes thereof.

In a thirteenth aspect, there is provided a computer program product, including computer program instructions that enable a computer to execute a method in any one aspect of the above first to second aspects or various implementation modes thereof.

In a fourteenth aspect, there is provided a computer program which, when run on a computer, enables a computer to execute the method in any one aspect of the above first to second aspects or various implementation modes thereof.

In technical solutions of implementations of the present disclosure, a limited condition may be adopted for allocating when feedback resources of a downlink transmission are allocated. The limited condition may include a slot, a half-slot, or N symbols. Therefore, a time delay of feedback information may be reduced, so that a time delay requirement may be met, and it is more suitable for a service sensitive to a transmission delay.

BRIEF DESCRIPTION OF DRAWINGS

FIG. 1 is schematic diagram one of an architecture of a communication system provided according to an implementation of the present disclosure.

FIG. 2 is schematic flowchart one of a method for allocating feedback resources provided according to an implementation of the present disclosure.

FIG. 3 is schematic diagram one of a scenario of feedback resource multiplexing provided according to an implementation of the present disclosure.

FIG. 4 is schematic diagram two of a scenario of feedback resource multiplexing provided according to an implementation of the present disclosure.

FIG. 5 is schematic flowchart two of a method for allocating feedback resources provided according to an implementation of the present disclosure.

FIG. 6 is schematic diagram three of a scenario of feedback resource multiplexing provided according to an implementation of the present disclosure.

FIG. 7 is schematic diagram four of a scenario of feedback resource multiplexing provided according to an implementation of the present disclosure.

FIG. 8 is schematic diagram one of a structure of a terminal device provided according to an implementation of the present disclosure.

DETAILED DESCRIPTION

Figure 9:
FIG. 9 is schematic diagram two of a structure of a terminal device provided according to an implementation of the present disclosure.

To understand features and technical contents of implementations of the present disclosure in more detail, realizations of implementations of the present disclosure will be described in detail below with reference to accompanying drawings, and the accompanying drawings are used for reference only but are not intended to limit implementations of the present disclosure.

The technical solutions in implementations of the present disclosure will be described below with reference to the drawings in implementations of the present disclosure. It is apparent that implementations described are just some implementations of the present disclosure, but not all implementations of the present disclosure. According to implementations of the present disclosure, all other implementations achieved by a person of ordinary skill in the art without paying an inventive effort are within the protection scope of the present disclosure.

The technical solutions of implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, or a 5G system.

Illustratively, a communication system 100 applied in an implementation of the present disclosure is shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in a LTE system, or a radio controller in a Cloud Radio Access Network (CRAN), or the network device may be a mobile switch center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 also includes at least one terminal device 120 located within the coverage area of the network device 110. As used herein, the term "terminal device" includes, but is not limited to, a device configured to connect via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or an apparatus, of another communication terminal, configured to receive/send a communication signal; and/or an Internet of Things (IoT) device. A terminal device configured to communicate via a wireless interface may be referred to as a "wireless communication terminal", a "wireless terminal" or a "mobile terminal". Examples of the mobile terminal include, but are not limited to, a satellite or cellular telephone, a Personal Communication System (PCS) terminal capable of combining with a cellular wireless telephone and data processing, faxing, and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved Public Land Mobile Network (PLMN), or the like.

Optionally, terminal direct connection (Device to Device, D2D) communication may be performed between the terminal devices 120.

Optionally, the 5G system or 5G network may be referred to as a New Radio (NR) system or an NR network.

FIG. 1 illustratively shows one network device and two terminal devices. Optionally, the wireless communication system 100 may include multiple network devices, and other quantity of terminal devices may be included within a coverage area of each network device, and this is not restricted in implementations of the present disclosure.

Optionally, the communication system 100 may also include other network entities such as a network controller, and a mobile management entity, and this is not restricted in implementations of the present disclosure.

It should be understood that, a device with a communication function in a network/system in implementations of the present disclosure may be referred to as a communication device. The communication system 100 shown in FIG. 1 is taken as an example. The communication device may include a network device 110 and a terminal device 120 which have communication functions, and the network device 110 and the terminal device 120 may be specific devices described above, which will not be described here again. The communication device may also include other devices in the communication system 100, for example, other network entities such as a network controller, a mobile management entity, and this is not restricted in implementations of the present disclosure.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

To understand features and technical contents of implementations of the present disclosure in more detail, realizations of implementations of the present disclosure will be described in detail below with reference to accompanying drawings, and the accompanying drawings are used for reference only but are not intended to limit implementations of the present disclosure.

Implementation One

An implementation of the present disclosure provides a method for allocating feedback resources applied to a terminal device, as shown in FIG. 2. The method includes act 201.

In act 201, feedback resource configuration information sent by a network side is received. The feedback resource configuration information is used for allocating feedback resources, and the allocation of the feedback resources is limited by a feedback multiplexing granularity or a feedback timing granularity.

The feedback multiplexing granularity represents a time domain range of a multiplexing window of feedback information. The time domain range is a slot, a half-slot, and N symbols, where N is an integer greater than or equal to 1. The feedback timing granularity is one of following: a slot, a half-slot, and N symbols, where N is an integer greater than or equal to 1.

Here, the feedback information is carried on the feedback resources. The feedback information may be feedback information for a downlink transmission, wherein the downlink transmission may be downlink control information (DCI) or a downlink transmission scheduled by DCI. When the downlink transmission is the downlink transmission scheduled by DCI, the feedback information may be information transmitted by a Physical Downlink Control Channel (PDCCH) or a Physical Downlink Shared Channel (PDSCH). Accordingly, the feedback resource may be a Physical Uplink Control Channel (PUCCH). The feedback information for the downlink transmission may be acknowledgement (ACK)/negative acknowledgement (NACK) information of a Hybrid Automatic Repeat ReQuest (HARQ).

After receiving the feedback resource configuration information sent by the network side, the method further includes: determining feedback resources for the downlink transmission based on the feedback resource configuration information.

A scenario provided in the implementation is that feedback resources of feedback information corresponding to the downlink transmission, such as PUCCH time domain Resources, are limited by an HARQ timing granularity or an HARQ-ACK multiplexing granularity.

That is to say, in the implementation, determining the feedback resources for the downlink transmission based on the feedback resource configuration information includes:
determining that the feedback resources of the feedback information are within a time domain range of the feedback multiplexing granularity, based on the feedback resource configuration information; or, determining that the feedback resources of the feedback information are within a time domain range of the feedback timing granularity based on the feedback resource configuration information.

For example, as shown in FIG. 3, the PUCCH time domain resources are limited by the HARQ timing granularity, such as a half-slot. That the PUCCH resources are limited by the HARQ timing granularity means that the time domain resources of PUCCH are within a range of a half-slot. Or, the PUCCH time domain resources are limited by the HARQ multiplexing granularity, such as a half-slot. That the PUCCH resources are limited by the HARQ multiplexing granularity means that the time domain resources of PUCCH are within a range of a half-slot. Specifically, with reference to FIG. 3, the feedback resources for PDSCH1, PDSCH2, and PDSCH3 may all be limited within a half-slot, then corresponding PUCCH1, PUCCH2, and PUCCH3 are all allocated within a range of a half-slot.

Further, when determining the feedback resources for the downlink transmission based on the feedback resource configuration information, the method further includes:
when determining that feedback resources allocated for at least two downlink transmissions are of a same feedback multiplexing granularity or feedback timing granularity based on the feedback resource configuration information, multiplexing the feedback resources of the at least two downlink transmissions within a same multiplexing window; and
when determining that feedback resources allocated for at least two downlink transmissions are of different feedback multiplexing granularities or feedback timing granularities base on the feedback resource configuration information, not multiplexing the feedback resources of the at least two downlink transmissions.

That is to say, it may be further determined whether to multiplex the feedback resources. That is, feedback resources of feedback information corresponding to different feedback multiplexing granularities or feedback timing granularities, such as PUCCH time domain resources, have different constraints accordingly. The pieces of feedback information HARQ-ACK corresponding to different feedback multiplexing granularities or feedback timing granularities are multiplexed respectively.

For example, for feedback information of the feedback multiplexing granularity or the feedback timing granularity, such as HARQ-ACK, same HARQ-ACK feedback information of the feedback multiplexing granularity is multiplexed in its corresponding HARQ multiplexing window, while HARQ multiplexing is not performed for different HARQ-ACKs corresponding to different feedback multiplexing granularities or feedback timing granularities. For example, in FIG. 3, PUCCH1 and PUCCH3 may be multiplexed, and feedback information may be transmitted on PUCCH 3. While PUCCH1, PUCCH3 and PUCCH2 are within different feedback multiplexing granularities or feedback timing granularities, they may not be multiplexed.

As shown in FIG. 4, a feedback multiplexing granularity or feedback timing granularity corresponding to PDSCH1-PDSCH3 is a half-slot, and a feedback multiplexing granularity or feedback timing granularity corresponding to PDSCH4 is a slot. PDSCH4 is not multiplexed with PDSCH1-PDSCH3.

Furthermore, when PDSCH1-PDSCH3 fall within a same HARQ-ACK multiplexing window, the PUCCHs are multiplexed, that is, PUCCH 2 and PUCCH3 are multiplexed on resources related to PUCCH2, while when falling in different HARQ-ACK multiplexing windows, the PUCCHs are not multiplexed, that is, PUCCH1 and PUCCH3 are transmitted independently.

The implementation also provides a following method: when there is a conflict between feedback resources of at least two downlink transmissions corresponding to different feedback multiplexing granularities or feedback timing granularities of feedback information, a priority of a later-scheduled feedback resource of a downlink transmission is higher than that of a first-scheduled feedback resource of a downlink transmission, or a priority of a feedback resource where feedback information occupies more resources is higher than that of a feedback resource where feedback information occupies less resources.

A conflict between feedback resources of at least two downlink transmissions with different feedback multiplexing granularities or feedback timing granularities may be understood as two feedback resources covering a same multiplexing window or a same feedback timing granularity, then both feedback resources may occupy feedback resources scheduled later.

Or, resources occupied by the feedback information may be measured by a size of occupied transport blocks (TB) or a size of occupied physical resource blocks (PRB). A priority of a feedback resource where the feedback information occupies more resources is configured as a high priority, and two feedback resources are both scheduled as feedback resources of a high priority for multiplexing.

Or, other ways may be adopted, such as setting a conflict handling way of a terminal device, the conflict handling way of the terminal device may be stipulated by a protocol and set by a network side, or the terminal may solve it by itself. For example, a later-scheduled feedback resource has a high priority. The protocol stipulates a rule, and a later-scheduled feedback resource may also be set to have a high priority, or a feedback resource with a larger TB SIZE or PRB number corresponds to a high priority.

It can be seen that by adopting above solutions, when allocating feedback resources of the downlink transmission, a limited condition may be adopted to perform the allocation. The limited condition may include a slot, a half-slot, or N symbols. Therefore, a time delay of feedback information may be reduced, so that a time delay requirement may be met, and the method is more suitable for a service sensitive to a transmission delay.

Implementation Two

An implementation of the present disclosure provides a method for allocating feedback resources, applied to a terminal device, as shown in FIG. 5. The feedback resource allocation method includes act 501.

In act 501, feedback resource configuration information sent by a network side is received. The feedback resource configuration information is used for allocating feedback resources, and the allocation of the feedback resources is not limited by a feedback multiplexing granularity or a feedback timing granularity, but is limited by a preset time domain threshold value.

The feedback multiplexing granularity represents a time domain range of a multiplexing window of the feedback information. The time domain range is a slot, a half-slot, and N symbols, where N is an integer greater than or equal to 1. The feedback timing granularity is one of following: a slot, a half-slot, and N symbols, where N is an integer greater than or equal to 1.

And the preset time domain threshold value is greater than or equal to the feedback multiplexing granularity or the feedback timing granularity.

After receiving the feedback resource configuration information sent by the network side, the method further includes: determining feedback resources for a downlink transmission based on the feedback resource configuration information.

Here, the feedback information is carried on the feedback resources. The feedback information may be feedback information for a downlink transmission. The downlink transmission may be downlink control information (DCI) or a downlink transmission scheduled by DCI. When the downlink transmission is a downlink transmission scheduled by DCI, the feedback information may be information transmitted by a Physical Downlink Control Channel (PDCCH) or a Physical Downlink Shared Channel (PDSCH). Accordingly, the feedback resource may be a Physical Uplink Control Channel (PUCCH). The feedback information for the downlink transmission may be acknowledgement (ACK)/negative acknowledgement (NACK) information of a Hybrid Automatic Repeat ReQuest (HARQ).

A difference of this implementation is that feedback resources corresponding to the downlink transmission in this implementation, such as PUCCH time domain resources, are not limited by the feedback multiplexing granularity or the feedback timing granularity. That is, PUCCH time domain resources may be across an HARQ timing granularity or an HARQ-ACK multiplexing granularity. However, PUCCH time domain resources are still limited by a slot or other time domain thresholds greater than or equal to the HARQ timing granularity or the HARQ-ACK multiplexing granularity.

That is to say, in this implementation, determining the feedback resources for the downlink transmission based on the feedback resource configuration information includes:
determining that M feedback multiplexing granularities or M feedback timing granularities are included in a time domain range of the feedback resource based on the feedback resource configuration information, wherein M is an integer greater than 1, and the time domain range of the feedback resources is not greater than the preset time domain threshold value.

The feedback resources may be across multiple feedback multiplexing granularities or feedback timing granularities.

The preset time domain threshold may be at least two feedback multiplexing granularities or at least two feedback timing granularities.

When determining the feedback resources for the downlink transmission based on the feedback resource configuration information, the feedback resources may be allocated to more than a half-slot, such as two half-slots, or three half-slots, as long as it is not greater than the preset time domain threshold value.

For example, as shown in FIG. 6, the feedback multiplexing granularity or the feedback timing granularity is a half-slot, but a time domain resource range of a feedback resource PUCCH for the downlink transmission is limited to a preset threshold. For example, a preset time domain threshold may be a slot, then PUCCH3 in the figure is greater than a half-slot but less than a slot.

When allocating that the time domain range of the feedback resources includes M feedback multiplexing granularities or M feedback timing granularities, the method further includes: determining whether to multiplex feedback information of at least two downlink transmissions on a same feedback resource based on starting points and/or end points of the feedback resources allocated for the at least two downlink transmissions.

The method specifically includes at least one of following:
determining to multiplex the feedback information of the at least two downlink transmissions on the same feedback resource, when the starting points of the feedback resources allocated for the at least two downlink transmissions are in the same feedback multiplexing granularity or feedback timing granularity; and
determining to multiplex the feedback information of the at least two downlink transmissions on the same feedback resources, when the end points of the feedback resources allocated for the at least two downlink transmissions are in the same feedback multiplexing granularity or feedback timing granularity.

For example, if starting points of two feedback resources are in one multiplexing window and ending points of the two feedback resources are in different multiplexing windows, the two pieces of the feedback information may be multiplexed on the same feedback resource. For example, as shown in FIG. 7, the starting points of PUCCH1 and PUCCH3 are in the same multiplexing window, then pieces of the feedback information transmitted by PUCCH1 and PUCCH3 may be both multiplexed in PUCCH 3.

Or, if endpoints of two feedback resources are in one multiplexing window and starting points of the two feedback resources are in different multiplexing windows, the two feedback information may be multiplexed on the same feedback resource. For example, as shown in FIG. 7, the endpoints of PUCCH 2 and PUCCH3 are in the same multiplexing window, then pieces of the feedback information transmitted by PUCCH2 and PUCCH 3 may be both multiplexed in PUCCH 3.

Or, when starting points of the feedback resources are in a same multiplexing window and ending points of the feedback resources are in a same multiplexing window, the two feedback resources may be multiplexed. That is to say, HARQ multiplexing is determined with reference to the starting points of PUCCH resources, the ending points of PUCCH resources, or both. For example, HARQ-ACKs whose starting points or ending points fall within the same HARQ timing granularity or HARQ-ACK multiplexing granularity are multiplexed.

Further, when end points of feedback resources allocated for at least two downlink transmissions are not at a boundary of the feedback multiplexing granularity or the feedback timing granularity, it is determined to multiplex the feedback information of the at least two downlink transmissions on the same feedback resource based on an information timing granularity where the starting points of the feedback resources of the at least two downlink transmissions are located. For example, when the end points of feedback resources for two downlink transmissions are not located at a boundary of the multiplexing window, whether to multiplex is determined based on starting points of the feedback resources. For example, if the end points are not at a boundary of an HARQ timing granularity or an HARQ-ACK multiplexing granularity, an HARQ-ACK multiplexing window where the starting points are located shall prevail; otherwise, an HARQ-ACK multiplexing window where the end points are located shall prevail.

The implementation also provides the following method: a priority of a later-scheduled feedback resource of a downlink transmission is higher than that of a first-scheduled feedback resource of a downlink transmission. Or, a priority of a feedback resource where feedback information occupies more resources is higher than that of a feedback resource where feedback information occupies less resources.

A conflict between feedback resources of at least two downlink transmissions with different feedback multiplexing granularities or feedback timing granularities may be understood as two feedback resources covering the same multiplexing window or the same feedback timing granularity, then two feedback resources may both occupy feedback resources scheduled later.

Or, the resources occupied by the feedback information may be measured by a size of occupied transport blocks (TB) or a size of occupied physical resource blocks (PRB). A priority of a feedback resource where feedback information occupies more resources is set as a high priority. Two feedback resources are both scheduled as feedback resources with a high priority for multiplexing.

Or, other ways may be adopted, such as setting a conflict handling way of a terminal device, the conflict handling way may be stipulated by a protocol and set by the network side, or the terminal may solve it by itself. For example, a later-scheduled feedback resource has a high priority. The protocol stipulates a rule, and a later-scheduled feedback resource may also be set to have a high priority, or a feedback resource with a larger TB SIZE or PRB number corresponds to a high priority.

It can be seen that by adopting the above solutions, feedback resources for the downlink transmission may be allocated by using a limited condition. The limited condition may include a slot, a half-slot, or N symbols. Therefore, a time delay of feedback information may be reduced, so that a time delay requirement may be met, and the method is more suitable for a service sensitive to a transmission delay.

Implementation Three

An implementation of the present disclosure provides a method for allocating feedback resources, applied to a network device, including:

sending configuration information of feedback resources to a terminal device; wherein the feedback resource configuration information is used for allocating feedback resources, and the allocation of the feedback resources is limited by a feedback multiplexing granularity or a feedback timing granularity.

The feedback multiplexing granularity represents a time domain range of a multiplexing window of feedback information. The time domain range is a slot, a half-slot, and N symbols, where N is an integer greater than or equal to 1. The feedback timing granularity is one of following: a slot, a half-slot, and N symbols, where N is an integer greater than or equal to 1.

Here, the feedback information is carried on the feedback resources. The feedback information may be feedback information for a downlink transmission. The downlink transmission may be downlink control information (DCI) or a downlink transmission scheduled by DCI. When the downlink transmission is the downlink transmission scheduled by DCI, the feedback information may be information transmitted by a Physical Downlink Control Channel (PDCCH) or a Physical Downlink Shared Channel (PDSCH). Accordingly, the feedback resource may be a Physical Uplink Control Channel (PUCCH). The feedback information for the downlink transmission may be acknowledgement (ACK)/negative acknowledgement (NACK) information of a Hybrid Automatic Repeat ReQuest (HARQ).

The above way of obtaining the feedback multiplexing granularity and feedback timing granularity may be determining the feedback multiplexing granularity or the feedback timing granularity of the terminal device based on one of a service type, a parameter of service quality, and a physical layer indication of a downlink transmission.

Specifically, determining the feedback multiplexing granularity or feedback timing granularity based on the service type and the parameter of service quality may be understood as determining by the terminal device itself. Determining the feedback multiplexing granularity or feedback timing granularity based on the physical layer indication may be understood as a way in which a network side configures the terminal device.

Further, the service type may be services with different time delays. For example, a feedback multiplexing granularity corresponding to a low-delay service may be a half-slot or N symbols. A feedback multiplexing granularity corresponding to a high-delay service may be set as a slot. The service type may be Enhance Mobile Broadband (eMBB) or ultra-high reliability and ultra-low delay communication (uRLLC). EMBB is a high-delay service, and uRLLC is a low-delay service.

The parameter of service quality may be processed with reference to a quality of service (QoS) parameter and based on a parameter used for describing a transmission delay in service quality. For example, a feedback multiplexing granularity corresponding to a low transmission delay may be a half-slot or N symbols. A feedback multiplexing granularity corresponding to a high transmission delay may be set as a slot.

Regarding the physical layer indication, it may be an indication for the terminal device through higher layer signaling, specifically, it may be RRC signaling, in which the feedback multiplexing granularity or feedback timing granularity to be adopted by the terminal device is indicated.

A scenario provided in an implementation is that feedback resources of feedback information corresponding to the downlink transmission, such as PUCCH time domain resources, are limited by an HARQ timing granularity or an HARQ-ACK multiplexing granularity.

That is to say, in the implementation, the method specifically is: allocating feedback resources of the feedback information within a time domain range of a feedback multiplexing granularity; or, allocating the feedback resources of the feedback information within a time domain of a feedback timing granularity.

For example, as shown in FIG. 3, PUCCH time domain resources are limited by the HARQ timing granularity, such as a half-slot. That the PUCCH resources are limited by the HARQ timing granularity means that the time domain resources of PUCCH are within a range of a half-slot. Or, the PUCCH time domain resources are limited by the HARQ multiplexing granularity, such as a half-slot. That the PUCCH resources are limited by the HARQ multiplexing granularity means that the time domain resources of PUCCH are within a range of a half-slot. Specifically, with reference to FIG. 3, feedback resources for PDSCH1, PDSCH2, and PDSCH3 may all be limited within a half-slot, then corresponding PUCCH1, PUCCH2, and PUCCH3 are all allocated within a range of a half-slot.

Further, after sending the feedback resource configuration information to the terminal device, the method further includes:
when allocating feedback resources for at least two downlink transmissions based on a same feedback multiplexing granularity or feedback timing granularity, determining that the terminal device multiplexes the feedback resources of the at least two downlink transmissions within a same multiplexing window; and
when allocating feedback resources for at least two downlink transmissions based on different feedback multiplexing granularities or feedback timing granularities, determining that the terminal device does not multiplex the feedback resources of the at least two downlink transmissions.

That is to say, when allocating the feedback resources, it may be further determined whether to multiplex the feedback resources. That is, feedback resources of feedback information corresponding to different feedback multiplexing granularities or feedback timing granularities, such as PUCCH time domain resources, have different constraints accordingly. The pieces of feedback information HARQ-ACK corresponding to different feedback multiplexing granularities or feedback timing granularities are multiplexed respectively.

For example, for feedback information of the feedback multiplexing granularity or the feedback timing granularity, such as HARQ-ACK, same HARQ-ACK feedback information of the feedback multiplexing granularity is multiplexed in its corresponding HARQ multiplexing window, while HARQ multiplexing is not performed for different HARQ-ACKs corresponding to different feedback multiplexing granularities or feedback timing granularities. For example, in FIG. 3, PUCCH1 and PUCCH3 may be multiplexed, and feedback information may be transmitted on PUCCH 3. While PUCCH1, PUCCH 3 and PUCCH2 are within different feedback multiplexing granularities or feedback timing granularities, and they may not be multiplexed.

As shown in FIG. 4, a feedback multiplexing granularity or feedback timing granularity corresponding to PDSCH1-PDSCH3 is a half-slot, and a feedback multiplexing granularity or feedback timing granularity corresponding to PDSCH4 is slot. PDSCH4 is not multiplexed with PDSCH1-PDSCH3.

Further, when PDSCH1-PDSCH3 fall within a same HARQ-ACK multiplexing window, the PUCCHs are multiplexed, that is, PUCCH 2 and PUCCH3 are multiplexed on resources related to PUCCH2, while when falling in different HARQ-ACK multiplexing windows, the PUCCHs are not multiplexed, that is, PUCCH1 and PUCCH3 are transmitted independently.

The implementation also provide a following method: when there is a conflict between feedback resources of at least two downlink transmissions corresponding to different feedback multiplexing granularities or feedback timing granularities of feedback information, a priority of a later-scheduled feedback resource of a downlink transmission is higher than that of a first-scheduled feedback resource of a downlink transmission, or a priority of a feedback resource where feedback information occupies more resources is higher than that of a feedback resource where feedback information occupies less resources.

A conflict between feedback resources of at least two downlink transmissions with different feedback multiplexing granularities or feedback timing granularities may be understood as two feedback resources covering a same multiplexing window or a same feedback timing granularity, then two feedback resources may both occupy later-scheduled feedback resources.

Or, resources occupied by the feedback information may be measured by a size of occupied transport blocks (TB) or a size of occupied physical resource blocks (PRB). A priority of a feedback resource where the feedback information occupies more resources is set as a high priority, and two feedback resources are both scheduled as feedback resources of a high priority for multiplexing.

Or, other ways may be adopted, such as setting a conflict handling way of a terminal device, the conflict handling way of the terminal device may be stipulated by a protocol and set by a network side, or the terminal may solve it by itself. For example, a later-scheduled feedback resource has a high priority. A rule is stipulated by the protocol, and a later-scheduled feedback resource may also be set to have a high priority, or a feedback resource with a larger TB SIZE or PRB number may have a high priority.

It can be seen that by adopting the above solutions, feedback resources of the downlink transmission may be allocated by using a limited condition. The limited condition may include a slot, a half-slots, or N symbols. Therefore, a time delay of feedback information may be reduced, so that a time delay requirement may be met, and the method is more suitable for a service sensitive to a transmission delay.

Implementation Four

An implementation of the present disclosure provides a method for allocating feedback resources, applied to a network device, including:

sending feedback resource configuration information to a terminal device; wherein the feedback resource configuration information is used for allocating feedback resources, and the allocation of the feedback resources is not limited by a feedback multiplexing granularity or a feedback timing granularity, but is limited by a preset time domain threshold value.

The feedback multiplexing granularity represents a time domain range of a multiplexing window of feedback information. The time domain range is a slot, a half-slot and N symbols, where N is an integer greater than or equal to 1. The feedback timing granularity is one of following: a slot, a half-slot, and N symbols, where N is an integer greater than or equal to 1.

The preset time domain threshold value is greater than or equal to the feedback multiplexing granularity or the feedback timing granularity.

Here, the feedback information is carried on the feedback resources. The feedback information may be feedback information for a downlink transmission. The downlink transmission may be downlink control information (DCI) or a downlink transmission scheduled by DCI. When the downlink transmission is a downlink transmission scheduled by DCI, the feedback information is information transmitted by a Physical Downlink Control Channel (PDCCH) or a Physical Downlink Shared Channel (PDSCH). Accordingly, the feedback resource may be a Physical Uplink Control Channel (PUCCH). The feedback information for the downlink transmission may be acknowledgement (ACK)/negative acknowledgement (NACK) information of a Hybrid Automatic Repeat ReQuest (HARQ).

The above way of obtaining the feedback multiplexing granularity and the feedback timing granularity may be determining the feedback multiplexing granularity or the feedback timing granularity based on one of a service type, a parameter of service quality, and a physical layer indication.

Specifically, determining the feedback multiplexing granularity or the feedback timing granularity based on the service type and the parameter of service quality may be understood as determining by the terminal device itself. Determining the feedback multiplexing granularity or feedback timing granularity based on the physical layer indication may be understood as a way in which a network side configures the terminal device.

Further, the service type may be services with different time delays. For example, a feedback multiplexing granularity corresponding to a low-delay service may be a half-slot or N symbols. A feedback multiplexing granularity corresponding to a high-delay service may be set as a slot. The service type may be Enhance Mobile Broadband (eMBB) or ultra-high reliability and ultra-low delay communication (uRLLC). EMBB is a high-delay service, and uRLLC is a low-delay service.

The parameter of service quality may be processed with reference to a quality of service (QoS) parameter and based on a parameter used for describing a transmission delay in service quality. For example, a feedback multiplexing granularity corresponding to a low transmission delay may be a half-slot or N symbols. A feedback multiplexing granularity corresponding to a high transmission delay may be set as a slot.

Regarding the physical layer indication, it may be an indication for the terminal device through higher layer signaling, specifically, it may be RRC signaling, in which the feedback multiplexing granularity or feedback timing granularity to be adopted by the terminal device is indicated.

A difference of this implementation is that feedback resources corresponding to a downlink transmission in this implementation, such as PUCCH time domain resources, are not limited by the feedback multiplexing granularity or the feedback timing granularity. That is, PUCCH time domain resources may be across the HARQ timing granularity or the HARQ-ACK multiplexing granularity. However, it is still limited by a slot or other time domain thresholds greater than or equal to the HARQ timing granularity or the HARQ-ACK multiplexing granularity.

That is to say, in the implementation, a time domain range of the feedback resources allocated to the terminal device includes M feedback multiplexing granularities or M feedback timing granularities, wherein M is an integer greater than 1, and the time domain range of the feedback resources is not greater than the preset time domain threshold value.

The feedback resources may be across multiple feedback multiplexing granularities or feedback timing granularities.

The preset time domain threshold may be at least two feedback multiplexing granularities or at least two feedback timing granularities.

When allocating feedback resources for a downlink transmission, the feedback resources may be allocated to more than a half-slot, such as two half-slots or three half-slots, as long as it is not greater than the preset time domain threshold.

For example, as shown in FIG. 5, a feedback multiplexing granularity or a feedback timing granularity is a half-slot, but a time domain resource range of a feedback resource PUCCH for the downlink transmission is limited to a preset threshold. For example, if a preset time domain threshold may be a slot, PUCCH3 in the figure is greater than a half-slot but less than a slot.

When sending the feedback resource configuration information to the terminal device, the method further includes: determining whether to multiplex the feedback information of at least two downlink transmissions on a same feedback resource based on starting points and/or end points of the feedback resources allocated for the at least two downlink transmissions.

Specifically it includes at least one of following:

determining that the terminal device multiplexes the feedback information of the at least two downlink transmissions on a same feedback resource when the starting points of the feedback resources of the at least two downlink transmissions allocated to the terminal device are located in a same feedback multiplexing granularity or feedback timing granularity; and determining that the terminal device multiplexes the feedback information of the at least two downlink transmissions on a same feedback resource when the end points of the feedback resources of the at least two downlink transmissions allocated to the terminal device are located in a same feedback multiplexing granularity or feedback timing granularity.

For example, if starting points of two feedback resources are in one multiplexing window and ending points of the two feedback resources are in different multiplexing windows, the two pieces of the feedback information may be multiplexed on the same feedback resource. For example, as shown in FIG. 6, the starting points of PUCCH1 and PUCCH3 are in a same multiplexing window, then pieces of the feedback information transmitted by PUCCH1 and PUCCH 3 may both be multiplexed in PUCCH 3.

Or, if endpoints of two feedback resources are in one multiplexing window and starting points of the two feedback resources are in different multiplexing windows, the two feedback information may be multiplexed on a same feedback resource. For example, as shown in FIG. 6, the endpoints of PUCCH 2 and PUCCH3 are in a same multiplexing window, then pieces of the feedback information transmitted by PUCCH2 and PUCCH 3 may both be multiplexed in PUCCH 3.

Or, when starting points of the feedback resources are in a same multiplexing window and ending points of the feedback resources are in a same multiplexing window, the two feedback resources may be multiplexed. That is to say, HARQ multiplexing is determined with reference to the starting points of PUCCH resources, the ending points of PUCCH resources, or both. For example, HARQ-ACKs whose starting points or ending points fall within a same HARQ timing granularity or HARQ-ACK multiplexing granularity are multiplexed.

Further, when end points of feedback resources allocated by the terminal device for at least two downlink transmissions are not at a boundary of a feedback multiplexing granularity or a feedback timing granularity, it may be determined that the terminal device multiplexes the feedback information of the at least two downlink transmissions on a same feedback resource based on the information timing granularity where the starting points of the feedback resources of the at least two downlink transmissions are located. For example, when the end points of feedback resources for two downlink transmissions are not located at a boundary of the multiplexing window, whether to multiplex is determined based on the starting points of the feedback resources. For example, if the end points are not at a boundary of an HARQ timing granularity or an HARQ-ACK multiplexing granularity, an HARQ-ACK multiplexing window where the starting points are located shall prevail; otherwise, an HARQ-ACK multiplexing window where the end points are located shall prevail.

This implementation also provides the following method: a priority of a later-scheduled feedback resource of a downlink transmission is higher than that of a first-scheduled feedback resource of a downlink transmission, or a priority of a feedback resource where feedback information occupying more resources is higher than that of a feedback resource where feedback information occupying less resources.

A conflict between feedback resources of at least two downlink transmissions with different feedback multiplexing granularities or feedback timing granularities may be understood as two feedback resources covering a same multiplexing window or a same feedback timing granularity, then two feedback resources may both occupy later-scheduled feedback resources.

Or, resources occupied by the feedback information may be measured by a size of the occupied transport blocks (TB) or a size of the occupied physical resource blocks (PRB). A priority of a feedback resource where feedback information occupies more resources is set as high priority. Two feedback resources are both scheduled as feedback resources with a high priority for multiplexing.

Or, other ways may be adopted, such as setting a conflict handling way of a terminal device, the conflict handling way of the terminal device may be stipulated by a protocol and set by a network side for the terminal, or the terminal may solve it by itself. For example, a later-scheduled feedback resource has a high priority. A rule is stipulated by the protocol, and a later-scheduled feedback resource may also be set to have a high priority, or a feedback resource with a larger TB SIZE or a PRB number may have a high priority.

It can be seen that by adopting the above solutions, feedback resources for the downlink transmission may be allocated by using a limited condition. The limited condition may include a slot, a half-slot, or N symbols. Therefore, a time delay of feedback information may be reduced, so that a time delay requirement may be met, and the method is more suitable for a service sensitive to a transmission delay.

Implementation Five

An implementation of the present disclosure provides a terminal device, as shown in FIG. 8. The terminal device includes a first communication unit 31 and a first processing unit 32.

The first communication unit 81 is configured to receive feedback resource configuration information sent by a network side. The feedback resource configuration information is used for allocating feedback resources, and the allocation of the feedback resources is limited by feedback multiplexing granularity or feedback timing granularity.

In the above, the feedback multiplexing granularity represents a time domain range of a multiplexing window of the feedback information. The time domain range is a slot, a half-slot, and N symbols, where N is an integer greater than or equal to 1. The feedback timing granularity is one of the following: a slot, a half-slot, and N symbols, where N is an integer greater than or equal to 1.

The first processing unit 82 is configured to determine feedback resources for downlink transmission based on the feedback resource configuration information.

Here, the feedback information is carried on the feedback resources. The feedback information may be feedback information for downlink transmission, wherein the downlink transmission may be downlink control information (DCI) or downlink transmission scheduled by DCI. When the downlink transmission is the downlink transmission scheduled by DCI, the feedback information may be information transmitted by a Physical Downlink Control Channel (PDCCH) or a Physical Downlink Shared Channel (PDSCH). Accordingly, the feedback resource may be a Physical Uplink Control Channel (PUCCH). The feedback information for the downlink transmission may be acknowledgement (ACK)/negative acknowledgement (NACK) information of a Hybrid Automatic Repeat ReQuest (HARQ).

A scenario provided in the implementation is that feedback resources of feedback information corresponding to a downlink transmission, such as PUCCH time domain resources, are limited by an HARQ timing granularity or an HARQ-ACK multiplexing granularity.

That is to say, in this implementation, the first processing unit 82 determines that the feedback resources of the feedback information are within a time domain range of a feedback multiplexing granularity based on the feedback resource configuration information; or, determines that the feedback resources of the feedback information are within a time domain range of a feedback timing granularity based on the feedback resource configuration information.

For example, as shown in FIG. 3, the PUCCH time domain resources are limited by the HARQ timing granularity, such as a half-slot. That the PUCCH resources are limited by the HARQ timing granularity means that the time domain resources of PUCCH are within a range of a half-slot. Or, the PUCCH time domain resources are limited by the HARQ multiplexing granularity, such as a half-slot. That the PUCCH resources are limited by the HARQ multiplexing granularity means that the time domain resources of PUCCH are within a range of a half-slot. Specifically, with reference to FIG. 3, the feedback resources for PDSCH1, PDSCH2, and PDSCH3 may all be limited within a half-slot, then the corresponding PUCCH1, PUCCH2, and PUCCH3 are all allocated within a range of a half-slot.

Further, when allocating the feedback resources based on a constraint of a feedback multiplexing granularity or a feedback timing granularity, the first processing unit 82 multiplexes feedback resources of at least two downlink transmissions within a same multiplexing window when allocating feedback resources for at least two downlink transmissions based on a same feedback multiplexing granularity or feedback timing granularity, or, does not multiplex feedback resources of the at least two downlink transmissions when allocating feedback resources for at least two downlink transmissions based on different feedback multiplexing granularities or feedback timing granularities.

That is to say, when allocating the feedback resources, it may be further determined whether to multiplex the feedback resources. That is, feedback resources of feedback information corresponding to different feedback multiplexing granularities or feedback timing granularities, such as PUCCH time domain resources, have different constraints accordingly. The pieces of feedback information HARQ-ACK corresponding to different feedback multiplexing granularities or feedback timing granularities are multiplexed respectively.

For example, for feedback information of the feedback multiplexing granularity or the feedback timing granularity, such as HARQ-ACK, same HARQ-ACK feedback information of the feedback multiplexing granularity is multiplexed in its corresponding HARQ multiplexing window, while HARQ multiplexing is not performed for different HARQ-ACKs corresponding to different feedback multiplexing granularities or feedback timing granularities. For example, in FIG. 3, PUCCH1 and PUCCH3 may be multiplexed, and feedback information may be transmitted on PUCCH 3. While PUCCH1, PUCCH 3 and PUCCH2 are within different feedback multiplexing granularities or feedback timing granularities, they may not be multiplexed.

As shown in FIG. 4, a feedback multiplexing granularity or feedback timing granularity corresponding to PDSCH1-PDSCH3 is a half-slot, and a feedback multiplexing granularity or feedback timing granularity corresponding to PDSCH4 is a slot. PDSCH4 is not multiplexed with PDSCH1-PDSCH3.

Further, when PDSCH1-PDSCH3 fall within a same HARQ-ACK multiplexing window, the PUCCHs are multiplexed, that is, PUCCH 2 and PUCCH3 are multiplexed on resources related to PUCCH2, while when falling in different HARQ-ACK multiplexing windows, the PUCCHs are not multiplexed, that is, PUCCH1 and PUCCH3 are transmitted independently.

In the implementation, for the first processing unit 82, when there is a conflict between feedback resources of at least two downlink transmissions corresponding to different feedback multiplexing granularities or feedback timing granularities of feedback information, a priority of a later-scheduled feedback resource of a downlink transmission is higher than that of a first-scheduled feedback resource of a downlink transmission, or a priority of a feedback resource where feedback information occupies more resources is higher than that of a feedback resource where feedback information occupies less resources.

A conflict between feedback resources of at least two downlink transmissions with different feedback multiplexing granularities or feedback timing granularities may be understood as two feedback resources covering a same multiplexing window or a same feedback timing granularity, then two feedback resources may both occupy later-scheduled feedback resources.

Or, resources occupied by the feedback information may be measured by a size of occupied transport blocks (TB) or a size of occupied physical resource blocks (PRB). A priority of a feedback resource where the feedback information occupies more resources is set as a high priority, and two feedback resources are scheduled as feedback resources with a high priority for multiplexing.

Or, other ways may be adopted, such as setting a conflict handling way of a terminal device, the conflict handling way of the terminal device may be stipulated by a protocol and set by a network side, or the terminal may solve it by itself. For example, a later-scheduled feedback resource has a high priority. A rule is stipulated by the protocol, and a later-scheduled feedback resources may also be set to have a high priority, or a feedback resource with a larger TB SIZE or PRB number may have a high priority.

It can be seen that by adopting above solutions, the downlink transmission feedback resources may be allocated by using a limited condition. The limited condition may include a slot, a half-slot, or N symbols. Therefore, a time delay of feedback information may be reduced, so that a time delay requirement may be met, and the method is more suitable for a service sensitive to a transmission delay.

Implementation Six

An implementation of the present disclosure provides a terminal device, as shown in FIG. 9, including a second communication unit 91.

The second communication unit 91 is configured to receive feedback resource configuration information sent by a network side. The feedback resource configuration information is used for allocating feedback resources, and the allocation of the feedback resources is not limited by a feedback multiplexing granularity or a feedback timing granularity, but is limited by a preset time domain threshold value.

The feedback multiplexing granularity represents a time domain range of a multiplexing window of feedback information. The time domain range is a slot, a half-slot, and N symbols, where N is an integer greater than or equal to 1. The feedback timing granularity is one of following: a slot, a half-slot, and N symbols, where N is an integer greater than or equal to 1.

And the preset time domain threshold value is greater than or equal to the feedback multiplexing granularity or the feedback timing granularity.

The terminal device further includes: a second processing unit 92, configured to determine feedback resources for a downlink transmission based on the feedback resource configuration information.

Here, the feedback information is carried on the feedback resources. The feedback information may be feedback information for a downlink transmission. The downlink transmission may be downlink control information (DCI) or a downlink transmission scheduled by DCI. When the downlink transmission is a downlink transmission scheduled by DCI, the feedback information is information transmitted by a Physical Downlink Control Channel (PDCCH) or a Physical Downlink Shared Channel (PDSCH). Accordingly, the feedback resource may be a Physical Uplink Control Channel (PUCCH). The feedback information for the downlink transmission may be acknowledgement (ACK)/negative acknowledgement (NACK) information of a Hybrid Automatic Repeat ReQuest (HARQ).

A difference of this implementation is that feedback resources corresponding to the downlink transmission in this implementation, such as PUCCH time domain resources, are not limited by the feedback multiplexing granularity or the feedback timing granularity. That is, PUCCH time domain resources may be across an HARQ timing granularity or an HARQ-ACK multiplexing granularity. However, PUCCH time domain resources are still limited by a slot or other time domain thresholds greater than or equal to the HARQ timing granularity or the HARQ-ACK multiplexing granularity.

That is, in this implementation, the second processing unit 92 determines that M feedback multiplexing granularities or M feedback timing granularities are included in a time domain range of feedback resources based on the feedback resource configuration information. M is an integer greater than 1. The time domain range of the feedback resources is not greater than the preset time domain threshold value.

The feedback resources may be across multiple feedback multiplexing granularities or feedback timing granularities.

The preset time domain threshold may be at least two feedback multiplexing granularities or at least two feedback timing granularities.

When the feedback resources for the downlink transmission are allocated, the feedback resources may be allocated to more than a half-slot, such as two half-slots or three half-slots, as long as it is not greater than the preset time domain threshold.

For example, as shown in FIG. 6, the feedback multiplexing granularity or the feedback timing granularity is a half-slot, but a time domain resource range of a feedback resource PUCCH for the downlink transmission is limited to a preset threshold. For example, a preset time domain threshold may be a slot, then PUCCH3 in the figure is greater than a half-slot but less than a slot.

When allocating that the time domain range of the feedback resources includes M feedback multiplexing granularities or M feedback timing granularities, the second processing unit 92 is further configured to: determine whether to multiplex feedback information of at least two downlink transmissions on a same feedback resource based on starting points and/or end points of the feedback resources allocated for the at least two downlink transmissions.

The second processing unit 92 is further configured to perform at least one of following:
  determining to multiplex the feedback information of the at least two downlink transmissions on a same feedback resource when starting points of the feedback resources allocated for the at least two downlink transmissions are in a same feedback multiplexing granularity or feedback timing granularity; and
  determining to multiplex the feedback information of the at least two downlink transmissions on a same feedback resource when end points of the feedback resources allocated for the at least two downlink transmissions are located in a same feedback multiplexing granularity or feedback timing granularity.

For example, if starting points of two feedback resources are in one multiplexing window and ending points of the two feedback resources are in different multiplexing windows, the two pieces of the feedback information may be multiplexed on a same feedback resource. For example, as shown in FIG. 7, starting points of PUCCH1 and PUCCH3 are in a same multiplexing window, then pieces of the feedback information transmitted by PUCCH1 and PUCCH 3 may be multiplexed in PUCCH 3.

Or, if endpoints of two feedback resources are in one multiplexing window and starting points of the two feedback resources are in different multiplexing windows, the two feedback information may be multiplexed on the same feedback resource. For example, as shown in FIG. 7, endpoints of PUCCH 2 and PUCCH3 are in a same multiplexing window, then pieces of the feedback information transmitted by PUCCH2 and PUCCH 3 may be both multiplexed in PUCCH 3.

Or, when starting points of the feedback resources are in a same multiplexing window and ending points of the feedback resources are in a same multiplexing window, the two feedback resources may be multiplexed. That is to say, HARQ multiplexing is determined with reference to starting points of PUCCH resources, ending points of PUCCH resources, or both. For example, HARQ-ACKs whose starting points or ending points fall within a same HARQ timing granularity or HARQ-ACK multiplexing granularity are multiplexed.

Further, the second processing unit 92 determines to multiplex the feedback information of at least two downlink transmissions on a same feedback resource based on an information timing granularity where the starting points of the feedback resources of the at least two downlink transmissions are located, when the end points of the feedback resources allocated for the at least two downlink transmissions are not at a boundary of the feedback multiplexing granularity or the feedback timing granularity. For example, when the end points of feedback resources for two downlink transmissions are not located at a boundary of a multiplexing window, whether to multiplex is determined based on the starting points of the feedback resources. For example, if the end points are not at a boundary of an HARQ timing granularity or an HARQ-ACK multiplexing granularity, an HARQ-ACK multiplexing window where the starting points are located shall prevail; otherwise, an HARQ-ACK multiplexing window where the end points are located shall prevail.

In the implementation, a priority of a later-scheduled feedback resource for a downlink transmission is higher than that of a first-scheduled feedback resource of a downlink transmission. Or, a priority of a feedback resource where feedback information occupies more resources is higher than that of a feedback resource where feedback information occupies less resources.

A conflict between feedback resources of at least two downlink transmissions with different feedback multiplexing granularities or feedback timing granularities may be understood as two feedback resources covering a same multiplexing window or a same feedback timing granularity, then both feedback resources may occupy the later-scheduled feedback resources.

Or, resources occupied by the feedback information may be measured by a size of occupied transport blocks (TB) or a size of the occupied physical resource blocks (PRB). A priority of a feedback resource where feedback information occupies more resources is set as a high priority, and two feedback resources are scheduled as feedback resources with a high priority for multiplexing.

Or, other ways may be adopted, such as setting a conflict handling way of a terminal device, the conflict handling way of the terminal device may be stipulated by a protocol and set by a network side. Or the terminal may solve it by itself.

For example, a later-scheduled feedback resource has a high priority. A rule is stipulated by the protocol, and a later-scheduled feedback resource may also be set to have a high priority, or a feedback resource with a larger TB SIZE or PRB number may have a high priority.

It can be seen that by adopting above solutions, the downlink transmission feedback resources may be allocated by using a limited condition. The limited condition may include a slot, a half-slot, or N symbols. Therefore, a time delay of feedback information may be reduced, so that a time delay requirement may be met, and the method is more suitable for a service sensitive to a transmission delay.

Implementation Seven

Figure 10:
FIG. 10 is schematic diagram one of a structure of a network device provided according to an implementation of the present disclosure.

An implementation of the present disclosure provides a network device, as shown in FIG. 10, including: a third communication unit 1001.

The third communication unit 1001 is configured to send feedback resource configuration information to a terminal device; wherein the feedback resource configuration information is used for allocating feedback resources, and the allocation of the feedback resources is limited by a feedback multiplexing granularity or a feedback timing granularity.

The feedback multiplexing granularity represents a time domain range of a multiplexing window of the feedback information. The time domain range is a slot, a half-slot, and N symbols, where N is an integer greater than or equal to 1. The feedback timing granularity is one of following: a slot, a half-slot, and N symbols, where N is an integer greater than or equal to 1.

Here, the feedback information is carried on the feedback resources. The feedback information may be feedback information for a downlink transmission. The downlink transmission may be downlink control information (DCI) or a downlink transmission scheduled by DCI. When the downlink transmission is the downlink transmission scheduled by DCI, the feedback information may be information transmitted by a Physical Downlink Control Channel (PDCCH) or a Physical Downlink Shared Channel (PDSCH). Accordingly, the feedback resource may be a Physical Uplink Control Channel (PUCCH). The feedback information for downlink transmission may be acknowledgement (ACK)/negative acknowledgement (NACK) information of a Hybrid Automatic Repeat ReQuest (HARQ).

With regard to the above-mentioned way of obtaining the feedback multiplexing granularity and the feedback timing granularity, the third processing unit 91 determines the feedback multiplexing granularity or the feedback timing granularity of the terminal device based on one of a service type, a parameter of service quality, and a physical layer indication of the downlink transmission.

Specifically, determining the feedback multiplexing granularity or the feedback timing granularity based on the service type and parameters of service quality may be understood as determining by the terminal device itself. Determining the feedback multiplexing granularity or the feedback timing granularity based on the physical layer indication may be understood as a way in which a network side configures the terminal device.

Further, the service type may be services with different time delays. For example, a feedback multiplexing granularity corresponding to a low-delay service may be a half-slot or N symbols. A feedback multiplexing granularity corresponding to a high-delay service may be set as a slot. The service type may be Enhance Mobile Broadband (eMBB) or ultra-high reliability and ultra-low delay communication (uRLLC). EMBB is a high-delay service, and uRLLC is a low-delay service.

The parameters of service quality may be processed with reference to a quality of service (QoS) parameter and based on a parameter used for describing a transmission delay in service quality. For example, a feedback multiplexing granularity corresponding to a low transmission delay may be a half-slot or N symbols. A feedback multiplexing granularity corresponding to a high transmission delay may be set as a slot.

Regarding the physical layer indication, it may be an indication for the terminal device through higher layer signaling, specifically, it may be RRC signaling, in which the feedback multiplexing granularity or feedback timing granularity to be adopted by the terminal device is indicated.

In a scenario provided in an implementation, feedback resources of feedback information corresponding to a downlink transmission, such as PUCCH time domain resources, are limited by an HARQ timing granularity or an HARQ-ACK multiplexing granularity.

That is, in implementations, the network device further includes:

a third processing unit 1002, configured to allocate feedback resources of the feedback information within a time domain range of the feedback multiplexing granularity; or, determine to allocate the feedback resources of the feedback information within a time domain of a feedback timing granularity.

For example, as shown in FIG. 3, PUCCH time domain resources are limited by an HARQ timing granularity, such as a half-slot. That the PUCCH resources are limited by the HARQ timing granularity means that time domain resources of PUCCH are within a range of a half-slot. Or, the PUCCH time domain resources are limited by an HARQ multiplexing granularity, such as a half-slot. That the PUCCH resources are limited by the HARQ multiplexing granularity means that the time domain resources of PUCCH are within a range of a half-slot. Specifically, with reference to FIG. 3, feedback resources for PDSCH1, PDSCH2, and PDSCH3 may all be limited within a half-slot, then corresponding PUCCH1, PUCCH2, and PUCCH3 are all allocated within a range of a half-slot.

Further, when determining to allocate the feedback resources by the terminal device based on a constraint of a feedback multiplexing granularity or a feedback timing granularity, the third processing unit 91 determines that the terminal device multiplexes feedback resources of at least two downlink transmissions within a same multiplexing window when allocating the feedback resources for the at least two downlink transmissions based on a same feedback multiplexing granularity or feedback timing granularity; and determines that the terminal device does not multiplex the feedback resources of the at least two downlink transmissions when allocating the feedback resources for the at least two downlink transmissions based on different feedback multiplexing granularities or feedback timing granularities.

That is to say, when allocating the feedback resources, it may be further determined whether to multiplex the feedback resources. That is, feedback resources of feedback information corresponding to different feedback multiplexing granularities or feedback timing granularities, such as PUCCH time domain resources, have different constraints accordingly. The pieces of feedback information HARQ-ACK corresponding to different feedback multiplexing granularities or feedback timing granularities are multiplexed respectively.

For example, for feedback information of the feedback multiplexing granularity or the feedback timing granularity, such as HARQ-ACK, same HARQ-ACK feedback information of the feedback multiplexing granularity is multiplexed in its corresponding HARQ multiplexing window, while HARQ multiplexing is not performed for different HARQ-ACKs corresponding to different feedback multiplexing granularities or feedback timing granularities. For example, in FIG. 3, PUCCH1 and PUCCH3 may be multiplexed, and feedback information may be transmitted on PUCCH 3. While PUCCH1, PUCCH 3 and PUCCH2 are within different feedback multiplexing granularities or feedback timing granularities, and they may not be multiplexed.

As shown in FIG. 4, a feedback multiplexing granularity or a feedback timing granularity corresponding to PDSCH1-PDSCH3 is a half-slot. A feedback multiplexing granularity or a feedback timing granularity corresponding to PDSCH4 is a slot. PDSCH4 is not multiplexed with PDSCH1-PDSCH3.

Further, when PDSCH1-PDSCH3 fall within a same HARQ-ACK multiplexing window, the PUCCHs are multiplexed, that is, PUCCH 2 and PUCCH3 are multiplexed on resources related to PUCCH2, while when falling in different HARQ-ACK multiplexing windows, the PUCCHs are not multiplexed, that is, PUCCH1 and PUCCH3 are transmitted independently.

In the implementation, for the third processing unit 1002, when there is a conflict between feedback resources of at least two downlink transmissions corresponding to different feedback multiplexing granularities or feedback timing granularities of feedback information, a priority of a later-scheduled feedback resource of a downlink transmission is higher than that of a first-scheduled feedback resource of a downlink transmission, or a priority of a feedback resource where feedback information occupying more resources is higher than that of a feedback resource where feedback information occupying less resources.

A conflict between feedback resources of at least two downlink transmissions with different feedback multiplexing granularities or feedback timing granularities may be understood as two feedback resources covering a same multiplexing window or a same feedback timing granularity, then both feedback resources may occupy later-scheduled feedback resources.

Or, resources occupied by the feedback information may be measured by a size of occupied transport blocks (TB) or a size of occupied physical resource blocks (PRB). A priority of a feedback resource where the feedback information occupies more resources is set as a high priority, and two feedback resources are scheduled as feedback resources with a high priority for multiplexing.

Or, other ways may be adopted, such as setting a conflict handling way of a terminal device, the conflict handling way of the terminal device may be stipulated by a protocol and set by a network side, or the terminal may solve it by itself. For example, a later-scheduled feedback resource has a high priority. A rule is stipulated by a protocol, and a later-scheduled feedback resources may also be set to have a high priority, or a feedback resource with a larger TB SIZE or a PRB number may have a high priority.

It can be seen that by adopting above solutions, feedback resources of the downlink transmission may be allocated by using a limited condition. The limited condition may include a slot, a half-slot, or N symbols. Therefore, a time delay of feedback information may be reduced, so that a time delay requirement may be met, and the method is more suitable for a service sensitive to a transmission delay.

Implementation Eight

Figure 11:
FIG. 11 is schematic diagram two of a structure of a network device provided according to an implementation of the present disclosure.

An implementation of the present disclosure provides a network device, as shown in FIG. 11, including: a fourth communication unit 1101.

The fourth communication unit 1101 is configured to send feedback resource configuration information to a terminal device. The feedback resource configuration information is used for allocating feedback resources, and the allocation of the feedback resources is not limited by a feedback multiplexing granularity or a feedback timing granularity, but is limited by a preset time domain threshold value.

The feedback multiplexing granularity represents a time domain range of a multiplexing window of feedback information. The time domain range is a slot, a half-slot, and N symbols, where N is an integer greater than or equal to 1. The feedback timing granularity is one of following: a slot, a half-slot, and N symbols, where N is an integer greater than or equal to 1.

The preset time domain threshold value is greater than or equal to a feedback multiplexing granularity or a feedback timing granularity.

Here, the feedback information is carried on the feedback resources. The feedback information may be feedback information for a downlink transmission. The downlink transmission may be downlink control information (DCI) or a downlink transmission scheduled by DCI. When the downlink transmission is a downlink transmission scheduled by DCI, the feedback information may be information transmitted by a Physical Downlink Control Channel (PDCCH) or a Physical Downlink Shared Channel (PDSCH). Accordingly, the feedback resource may be a Physical Uplink Control Channel (PUCCH). The feedback information for the downlink transmission may be acknowledgement (ACK)/negative acknowledgement (NACK) information of a Hybrid Automatic Repeat ReQuest (HARQ).

With regard to the above way of obtaining the feedback multiplexing granularity and the feedback timing granularity, the fourth processing unit determines the feedback multiplexing granularity or the feedback timing granularity based on one of a service type, a parameter of service quality, and a physical layer indication.

Specifically, determining the feedback multiplexing granularity or the feedback timing granularity based on the service type and the parameter of service quality may be understood as determining by the terminal device itself. Determining the feedback multiplexing granularity or feedback timing granularity through the physical layer indication may be understood as a way in which a network side configures the terminal device.

Further, the service type may be services with different time delays. For example, a feedback multiplexing granularity corresponding to a low-delay service may be a half-slot or N symbols. A feedback multiplexing granularity corresponding to a high-delay service may be set as a slot. The service type may be Enhance Mobile Broadband (eMBB) or ultra-high reliability and ultra-low delay communication (uRLLC). EMBB is a high-delay service, and uRLLC is a low-delay service.

The parameter of service quality may be processed with reference to a quality of service (QoS) parameter and based on a parameter used for describing a transmission delay in service quality. For example, a feedback multiplexing granularity corresponding to a low transmission delay may be a half-slot or N symbols. A feedback multiplexing granularity corresponding to a high transmission delay may be set as a slot.

Regarding the physical layer indication, it may be an indication for the terminal device through higher layer signaling, specifically, it may be RRC signaling, in which the feedback multiplexing granularity or feedback timing granularity to be adopted by the terminal device is indicated.

A difference of this implementation is that feedback resources corresponding to a downlink transmission in this implementation, such as PUCCH time domain resources, are not limited by a feedback multiplexing granularity or a feedback timing granularity. That is, PUCCH time domain resources may be across an HARQ timing granularity or an HARQ-ACK multiplexing granularity. However, it is still limited by a slot or other time domain thresholds greater than or equal to the HARQ timing granularity or the HARQ-ACK multiplexing granularity.

That is, the network device further includes:

a fourth processing unit 1102, configured to allocate, for the terminal device, that a time domain range of feedback resources includes M feedback multiplexing granularities or M feedback timing granularities; M is an integer greater than 1; and the time domain range of the feedback resources is not greater than the preset time domain threshold value.

The feedback resources may be across multiple feedback multiplexing granularities or feedback timing granularities.

The preset time domain threshold may be at least two feedback multiplexing granularities or at least two feedback timing granularities.

When allocating feedback resources for a downlink transmission, the feedback resources may be allocated to more than a half-slot, such as two half-slots or three half-slots, as long as it is not greater than the preset time domain threshold.

For example, as shown in FIG. 5, the feedback multiplexing granularity or the feedback timing granularity is a half-slot, but a time domain resource range of a feedback resource PUCCH for a downlink transmission is limited to a preset threshold. For example, a preset time domain threshold may be a slot, then PUCCH3 in the figure is greater than a half-slot but less than a slot.

When allocating that a time domain range of the feedback resources includes M feedback multiplexing granularities or M feedback timing granularities, the fourth processing unit 1102 is further configured to: determine whether to multiplex feedback information of at least two downlink transmissions on a same feedback resource based on starting points and/or end points of the feedback resources allocated for the at least two downlink transmissions.

The fourth processing unit 1102 is further configured to perform at least one of following acts:

determining that the terminal device multiplexes the feedback information of the at least two downlink transmissions on a same feedback resource when the starting points of the feedback resources of the at least two downlink transmissions allocated to the terminal device are located in a same feedback multiplexing granularity or feedback timing granularity; and determining that the terminal device multiplexes the feedback information of the at least two downlink transmissions on a same feedback resource when the end points of the feedback resources of the at least two downlink transmissions allocated to the terminal device are located in a same feedback multiplexing granularity or feedback timing granularity.

For example, if starting points of two feedback resources are in one multiplexing window and ending points of the two feedback resources are in different multiplexing windows, the two pieces of the feedback information may be multiplexed on a same feedback resource. For example, as shown in FIG. 6, the starting points of PUCCH1 and PUCCH3 are in a same multiplexing window, then pieces of the feedback information transmitted by PUCCH1 and PUCCH 3 may both be multiplexed in PUCCH 3.

Or, if endpoints of two feedback resources are in one multiplexing window and starting points of the two feedback resources are in different multiplexing windows, the two feedback information may be multiplexed on a same feedback resource. For example, as shown in FIG. 6, endpoints of PUCCH 2 and PUCCH3 are in a same multiplexing window, then pieces of the feedback information transmitted by PUCCH2 and PUCCH 3 may both be multiplexed in PUCCH 3.

Or, when starting points of the feedback resources are in a same multiplexing window and ending points of the feedback resources are in a same multiplexing window, the two feedback resources may be multiplexed. That is to say, HARQ multiplexing is determined with reference to the starting points of PUCCH resources, the ending points of PUCCH resources, or both. For example, HARQ-ACKs whose starting points or ending points fall within the same HARQ timing granularity or HARQ-ACK multiplexing granularity are multiplexed.

Further, the fourth processing unit 1102 determines that the terminal device multiplexes the feedback information of the at least two downlink transmissions on the same feedback resource based on the information timing granularity where the starting points of the feedback resources of the at least two downlink transmissions are located when the end points of the feedback resources allocated to the terminal device are not at the boundary of the feedback multiplexing granularity or the feedback timing granularity. For example, when the end points of feedback resources for two downlink transmissions are not located at the boundary of the multiplexing window, whether to multiplex is determined based on the starting points of the feedback resources. For example, if the end points are not at a boundary of an HARQ timing granularity or an HARQ-ACK multiplexing granularity, an HARQ-ACK multiplexing window where the starting points are located shall prevail. Otherwise, an HARQ-ACK multiplexing window where the end points are located shall prevail.

A priority of a later-scheduled feedback resource of a downlink transmission is higher than that of a first-scheduled feedback resource of a downlink transmission, or a priority of a feedback resource where feedback information occupies more resources is higher than that of a feedback resource where feedback information occupies less resources.

A conflict between feedback resources of at least two downlink transmissions with different feedback multiplexing granularities or feedback timing granularities may be understood as two feedback resources covering a same multiplexing window or a same feedback timing granularity, then two feedback resources may both occupy the later-scheduled feedback resources.

Or, resources occupied by the feedback information may be measured by a size of the occupied transport blocks (TB) or a size of the occupied physical resource blocks (PRB). A priority of a feedback resource where feedback information occupies more resources is set as a high priority. Two feedback resources are schedule as feedback resources with a high priority for multiplexing.

Or, other ways may be adopted, such as setting a conflict handling way of a terminal device, the conflict handling way of the terminal device may be stipulated by a protocol and set by a network side for the terminal, or the terminal may solve it by itself. For example, a later-scheduled feedback resource has a high priority. A rule is stipulated by the protocol, and a later-scheduled feedback resource may also be set to have a high priority, or a feedback resource with a larger TB SIZE or a PRB number may have a high priority.

It can be seen that by adopting above solutions, the feedback resources for the downlink transmission may be allocated by using a limited condition. The limited condition may include a slot, a half-slot, or N symbols. Therefore, a time delay of feedback information may be reduced, so that a time delay requirement may be met, and the method is more suitable for a service sensitive to a transmission delay.

Figure 12:
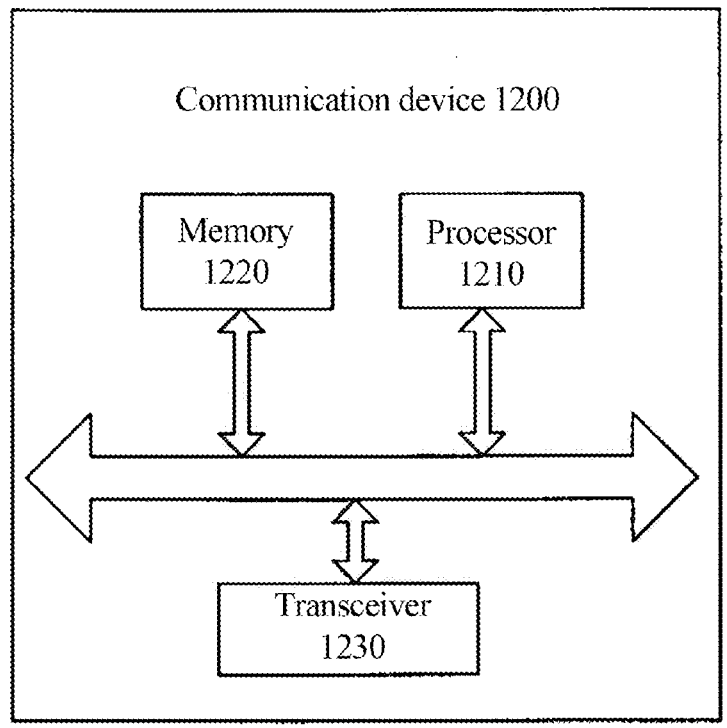
FIG. 12 is a schematic diagram of a structure of a communication device provided according to an implementation of the present disclosure.

FIG. 12 is a schematic structure diagram of a communication device 1200 provided according to an implementation of the present disclosure. The communication device may be a terminal device or a network device as described above in implementations. A communication device 1200 shown in FIG. 12 includes a processor 1210. The processor 1210 may call and run a computer program from a memory to implement a method in implementations of the present disclosure.

Optionally, as shown in FIG. 12, the communication device 1200 may further include a memory 1220. The processor 1210 may call and run a computer program from the memory 1220 to implement a method in implementations of the present disclosure.

The memory 1220 may be a separate device independent of the processor 1210 or may be integrated in the processor 1210.

Optionally, as shown in FIG. 12, the communication device 1200 may further include a transceiver 1230. The processor 1210 may control the transceiver 1230 to communicate with other devices. Specifically, the transceiver 1230 may send information or data to other devices or receive information or data sent by other devices.

The transceiver 1230 may include a transmitter and a receiver. The transceiver 1230 may further include antennas, and the number of antennas may be one or more.

Optionally, the communication device 1200 may be specifically a network device of implementations of the present disclosure, and the communication device 1200 may implement corresponding procedures implemented by a network device in various methods of implementations of the present disclosure, which will not be repeated here for brevity.

Optionally, the communication device 1200 may be specifically a terminal device or a network device of implementations of the present disclosure. The communication device 1200 may implement the corresponding procedures implemented by the mobile terminal/terminal device in various methods of implementations of the present disclosure, which will not be repeated here for brevity.

Figure 13:
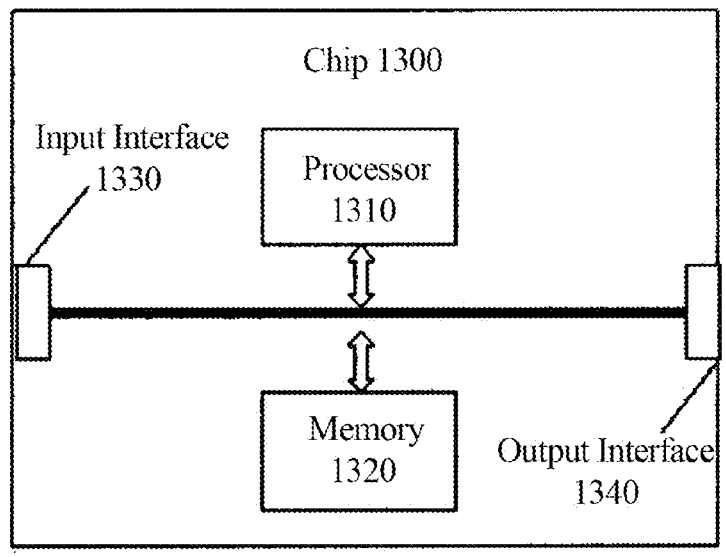
FIG. 13 is a schematic block diagram of a chip provided according to an implementation of the present disclosure.

FIG. 13 is a schematic diagram of a structure of a chip of an implementation of the present disclosure. A chip 1300 shown in FIG. 13 includes a processor 1310. The processor 1310 may call and run a computer program from a memory to implement the methods in implementations of the present disclosure.

Optionally, as shown in FIG. 13, the chip 1300 may further include a memory 1320. The processor 1310 may call and run a computer program from the memory 1320 to implement the methods in implementations of the present disclosure.

The memory 1320 may be a separate device independent of the processor 1310 or may be integrated in the processor 1310.

Optionally, the chip 1300 may further include an input interface 1330. The processor 1310 may control the input interface 1330 to communicate with other devices or chips. Specifically, information or data sent by other devices or chips may be acquired.

Optionally, the chip 1300 may further include an output interface 1340. The processor 1310 may control the output interface 1340 to communicate with other devices or chips. Specifically, information or data may be output to other devices or chips.

Optionally, the chip may be applied in a network device of implementations of the present disclosure, and the chip may implement the corresponding processes implemented by the network device in various methods of implementations of the present disclosure, which will not be repeated here for brevity.

Optionally, the chip may be applied in a terminal device of implementations of the present disclosure, and the chip may implement the corresponding procedures implemented by a terminal device in various methods of implementations of the present disclosure, which will not be repeated here for brevity.

It should be understood that the chip mentioned in implementations of the present disclosure may be referred to as a system-level chip, a system chip, a chip system or a system-on-chip, etc.

Figure 14:
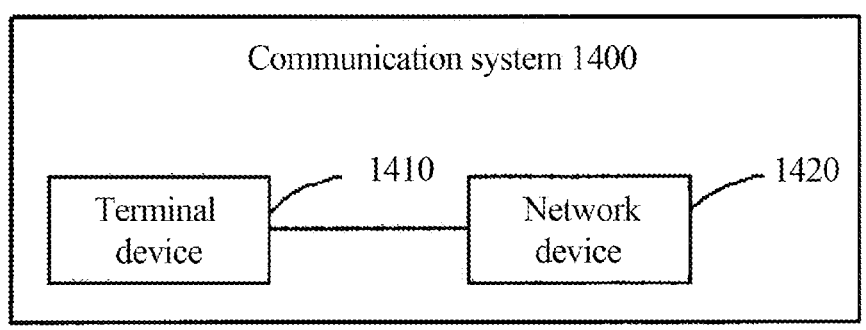
FIG. 14 is schematic diagram two of an architecture of a communication system provided according to an implementation of the present disclosure.

FIG. 14 is a schematic block diagram of a communication system 1400 provided according to an implementation of the present disclosure. As shown in FIG. 14, the communication system 1400 may include a terminal device 1410 and a network device 1420.

Herein, the terminal device 1410 may be configured to implement the corresponding functions implemented by the terminal device in the above-mentioned method, and the network device 1420 may be configured to implement the corresponding functions implemented by the network device in the above-mentioned method, which will not be repeated here for brevity.

It should be understood that, the processor in an implementation of present disclosure may be an integrated circuit chip having a signal processing capability. In an implementation process, the acts of the foregoing method implementations may be implemented by using an integrated logic circuit of hardware in the processor or instructions in a form of software. The processor may be a general purpose processor, a digital signal processor (Digital Signal Processing, DSP), an application specific integrated circuit (Application Specific Integrated Circuit, ASIC), a field programmable gate array (Field Programmable Gate Array, FPGA) or another programmable logic device, a discrete gate or a transistor logic device, or a discrete hardware component. Various methods, acts and logical block diagrams disclosed in an implementation of present disclosure may be implemented or performed. The general purpose processor may be a microprocessor, or the processor may be any conventional processor or the like. The acts of the method disclosed with reference to an implementation of present disclosure may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

It may be understood that, the memory in an implementation of present disclosure may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memories in the systems and methods described in this specification are intended to include, but are not limited to, these and any other suitable types of memories.

It should be understood that, the foregoing memory is an example for illustration and should not be construed as limiting. For example, the memory in implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memories in implementations of the present disclosure are intended to include, but are not limited to, these and any other suitable types of memories.

An implementation of the present disclosure further provides a computer readable storage medium configured to store a computer program.

Optionally, the computer readable storage medium may be applied in a network device of implementations of the present disclosure, and the computer program enables a computer to perform corresponding procedures implemented by a network device in various methods of implementations of the present disclosure, which will not be repeated here for brevity.

Optionally, the computer readable storage medium may be applied in a terminal device of implementations of the present disclosure, and the computer program enables a computer to execute corresponding procedures implemented by a mobile terminal/terminal device in various methods of implementations of the present disclosure, which will not be repeated here for brevity.

An implementation of the present disclosure also provides a computer program product including computer program instructions.

Optionally, the computer program product may be applied in a network device of implementations of the present disclosure, and the computer program instructions enable a computer to execute corresponding procedures implemented by a network device in various methods of implementations of the present disclosure, which will not be repeated here for brevity.

Optionally, the computer program product may be applied in a mobile terminal/terminal device of implementations of the present disclosure, and the computer program instructions enable a computer to perform corresponding procedures implemented by a mobile terminal/terminal device in various methods of implementations of the present disclosure, which will not be repeated here for brevity.

An implementation of the present disclosure also provides a computer program.

Optionally, the computer program may be applied in a network device of implementations of the present disclosure. When the computer program is run on the computer, the computer is enabled to execute corresponding procedures implemented by a network device in various methods of implementations of the present disclosure, which will not be repeated here for brevity.

Optionally, the computer program may be applied in a mobile terminal/terminal device of implementations of the present disclosure. When the computer program is run on the computer, the computer is enabled to execute corresponding procedures implemented by a mobile terminal/terminal device in various methods of implementations of the present disclosure, which will not be repeated here for brevity.

Those of ordinary skill in the art will recognize that the exemplary elements and algorithm acts described in combination with implementations disclosed herein may be implemented in electronic hardware, or a combination of computer software and electronic hardware. Whether these functions are implemented in hardware or software depends on the specific applications and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection between apparatuses or units through some interface, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for enabling a computer device (which may be a personal computer, a server, or a network device and the like) to perform all or part of the acts of the method described in various implementations of the present disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What is claim is:

1. A method for allocating feedback resources, applied to a terminal device, comprising:
    receiving feedback resource configuration information sent by a network side; wherein the feedback resource configuration information is used for allocating feedback resources, and the allocation of the feedback resources is limited by a feedback multiplexing granularity or a feedback timing granularity;
    wherein the feedback multiplexing granularity represents a time domain range of a multiplexing window of the feedback information; the time domain range is a slot, a half-slot, and N symbols, where N is an integer greater than or equal to 1; and the feedback timing granularity is one of the following: a slot, a half-slot, and N symbols, where N is an integer greater than or equal to 1;
    wherein after receiving the feedback resource configuration information sent by the network side, the method further comprises:
    determining feedback resources for a downlink transmission based on the feedback resource configuration information; wherein when determining the feedback resources for the downlink transmission based on the feedback resource configuration information, the method further comprises:
    multiplexing feedback resources of at least two downlink transmissions within a same multiplexing window when determining that the feedback resources allocated for the at least two downlink transmissions are of a same feedback multiplexing granularity or feedback timing granularity based on the feedback resource configuration information; and
    not multiplexing the feedback resources of the at least two downlink transmissions when determining that the feedback resource allocated for the at least two downlink transmissions are of different feedback multiplexing granularities or feedback timing granularities based on the feedback resource configuration information.

2. The method of claim 1, wherein the method further comprises:
    determining the feedback multiplexing granularity or the feedback timing granularity based on one of a service type, a parameter of service quality, and a physical layer indication.

3. A method for allocating feedback resources, applied to a network device, comprising:
    sending feedback resource configuration information to a terminal device; wherein the feedback resource configuration information is used for allocating feedback resources, and the allocation of the feedback resources is limited by a feedback multiplexing granularity or a feedback timing granularity;
    wherein the feedback multiplexing granularity represents a time domain range of a multiplexing window of feedback information; the time domain range is a slot, a half-slot, and N symbols, where N is an integer greater than or equal to 1; and the feedback timing granularity is one of the following: a slot, a half-slot, and N symbols, where N is an integer greater than or equal to 1; wherein sending the feedback resource configuration information to the terminal device further comprises:
    allocating the feedback resources of the feedback information to be within a time domain of a feedback timing granularity; wherein after sending the feedback resource configuration information to the terminal device, the method further comprises:
    determining that the terminal device multiplexes feedback resources of at least two downlink transmissions within a same multiplexing window when allocating the feedback resources for the at least two downlink transmissions based on a same feedback multiplexing granularity or feedback timing granularity; and
    determining that the terminal device does not multiplex feedback resources of the at least two downlink transmissions when allocating the feedback resources for the at least two downlink transmissions based on different feedback multiplexing granularities or feedback timing granularities.

4. The method of claim 3, wherein the method further comprises:
    determining the feedback multiplexing granularity or the feedback timing granularity of the terminal device based on one of a service type, a parameter of service quality, and a physical layer indication of the downlink transmission.

5. A terminal device, comprising: a processor and a transceiver, wherein
    the transceiver is configured to receive feedback resource configuration information sent by a network side; wherein the feedback resource configuration information is used for allocating feedback resources, and the allocation of the feedback resources is limited by a feedback multiplexing granularity or a feedback timing granularity;
    wherein the feedback multiplexing granularity represents a time domain range of a multiplexing window of the feedback information; the time domain range is a slot, a half-slot, and N symbols, where N is an integer greater than or equal to 1; and the feedback timing granularity is one of the following: a slot, a half-slot, and N symbols, where N is an integer greater than or equal to 1; wherein the processor is configured to determine feedback resources for a downlink transmission based on the feedback resource configuration information;

wherein the processor is configured to multiplex feedback resources of at least two downlink transmissions within a same multiplexing window when determining that the feedback resources allocated for the at least two downlink transmissions are of a same feedback multiplexing granularity or feedback timing granularity based on the feedback resource configuration information; and not to multiplex the feedback resources of the at least two downlink transmissions when determining that the feedback resources allocated for the at least two downlink transmissions are of different feedback multiplexing granularities or feedback timing granularities base on the feedback resource configuration information.

6. The terminal device of claim 5, wherein the processor is configured to determine the feedback multiplexing granularity or the feedback timing granularity based on one of a service type, a parameter of quality of service, and a physical layer indication.

7. A network device, comprising: a processor and a transceiver, wherein
the transceiver is configured to send feedback resource configuration information to a terminal device; wherein the feedback resource configuration information is used for allocating feedback resources, and the allocation of the feedback resources is limited by a feedback multiplexing granularity or a feedback timing granularity;
wherein the feedback multiplexing granularity represents a time domain range of a multiplexing window of feedback information; the time domain range is a slot, a half-slot, and N symbols, where N is an integer greater than or equal to 1; and the feedback timing granularity is one of the following: a slot, a half-slot, and N symbols, where N is an integer greater than or equal to 1; wherein the processor is configured to allocate the feedback resources of the feedback information to be within a time domain range of a feedback multiplexing granularity;
wherein the processor is configured to determine that the terminal device multiplexes feedback resources of at least two downlink transmissions within a same multiplexing window when allocating the feedback resources for the at least two downlink transmissions based on a same feedback multiplexing granularity or feedback timing granularity; and
determine that the terminal device does not multiplex feedback resources of the at least two downlink transmissions when allocating the feedback resources for the at least two downlink transmissions based on different feedback multiplexing granularities or feedback timing granularities.

8. The network device of claim 7, wherein the processor is configured to indicate the feedback multiplexing granularity or the feedback timing granularity of the terminal device based on one of a service type, a parameter of service quality, and a physical layer indication of the downlink transmission.

* * * * *